United States Patent
Pentz et al.

(10) Patent No.: US 6,471,127 B2
(45) Date of Patent: Oct. 29, 2002

(54) DATA CARD

(75) Inventors: Jamily Pentz, Tega Cay, SC (US); Emmet Burns, Charlotte, NC (US); Richard J. Collins, Highland Park, IL (US); R. Bruce Montgomery, Charlotte, NC (US); A. Allen Kendle, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 09/988,151

(22) Filed: Nov. 19, 2001

(65) Prior Publication Data

US 2002/0092914 A1 Jul. 18, 2002

Related U.S. Application Data

(63) Continuation of application No. 09/611,320, filed on Jul. 6, 2000, and a continuation of application No. 29/141,685, filed on May 11, 2001, now Pat. No. Des. 453,338, and a continuation of application No. 29/141,652, filed on May 11, 2001, now Pat. No. Des. 453,337, and a continuation of application No. 29/141,645, filed on May 11, 2001, now Pat. No. Des. 453,160, and a continuation of application No. 29/141,642, filed on May 11, 2001, now Pat. No. Des. 453,336, and a continuation of application No. 29/141,688, filed on May 11, 2001, now Pat. No. Des. 453,161, and a continuation of application No. 29/141,704, filed on May 11, 2001, now Pat. No. Des. 460,455, and a continuation of application No. 29/141,703, filed on May 11, 2001, now Pat. No. Des. 453,517, and a continuation of application No. 29/141,691, filed on May 11, 2001, now Pat. No. Des. 453,516, and a continuation of application No. 29/141,702, filed on May 11, 2001, now Pat. No. Des. 455,339, and a continuation of application No. 29/141,692, filed on May 11, 2001, and a continuation of application No. 29/141,701, filed on May 11, 2001, and a continuation of application No. 29/141,700, filed on May 11, 2001, now Pat. No. Des. 456,814, and a continuation of application No. 29/141,693, filed on May 11, 2001, and a continuation of application No. 29/141,699, filed on May 11, 2001, now Pat. No. Des. 460,454, and a continuation of application No. 29/142,203, filed on May 22, 2001.

(60) Provisional application No. 60/263,756, filed on Jan. 25, 2001.

(51) Int. Cl.$^7$ .............................................. G06K 19/00
(52) U.S. Cl. ...................................... 235/487; 235/493
(58) Field of Search ................................ 235/493, 492, 235/487

(56) References Cited

U.S. PATENT DOCUMENTS 3,230,650 A    1/1966   Orkin
4,027,405 A   *   6/1977   Schloss ...................... 360/101

(List continued on next page.)

FOREIGN PATENT DOCUMENTS

WO    IB-WO 93/11510 A1    6/1993

OTHER PUBLICATIONS

Identification cards—Physical characteristics, ISO/IEC, 7810: 1995(E).
Identification cards—Recording technique—Part 1: Embossing, ISO/IEC, 7811-1: 1995(E).
Identification cards—Recording technique—Part 2: Magnetic Stripe—Low coercivity, ISO/IEC, 7811-2: 2001(E).

(List continued on next page.)

*Primary Examiner*—Karl D. Frech
*Assistant Examiner*—Lisa M. Caputo
(74) *Attorney, Agent, or Firm*—Michael A. Springs; Covington & Burling

(57) ABSTRACT

A data card is reduced in size from the conventional standard size credit card. Accessibility of the card is enhanced because the card may be stored in a separate location from conventionally sized cards, such as on a key-chain or similar device. The card of the present invention has a means for storing information, such as a magnetic stripe or computer chip.

57 Claims, 10 Drawing Sheets

U.S. PATENT DOCUMENTS

| | | | |
|---|---|---|---|
| 4,079,883 A | | 3/1978 | Calder |
| 4,338,805 A | | 7/1982 | Nygren |
| 4,443,027 A | | 4/1984 | McNeely et al. |
| 4,628,195 A | | 12/1986 | Baus |
| 4,650,981 A | * | 3/1987 | Foletta ................... 235/380 |
| 4,682,794 A | | 7/1987 | Margolin |
| 4,701,601 A | * | 10/1987 | Francini et al. ............ 235/380 |
| 4,711,996 A | | 12/1987 | Drexler |
| 4,856,310 A | | 8/1989 | Parienti |
| 4,914,281 A | | 4/1990 | Benton et al. |
| 5,061,845 A | | 10/1991 | Pinnavaia |
| 5,090,736 A | * | 2/1992 | Minkus ................... 283/107 |
| 5,096,228 A | | 3/1992 | Rinderknecht |
| 5,250,341 A | | 10/1993 | Kobayashi et al. |
| 5,255,941 A | | 10/1993 | Solomon |
| 5,700,037 A | | 12/1997 | Keller |
| 5,844,230 A | | 12/1998 | Lalonde |
| D406,861 S | | 3/1999 | Leedy, Jr. |
| 5,883,377 A | * | 3/1999 | Chapin, Jr. ................ 235/487 |
| 6,003,763 A | * | 12/1999 | Gallagher et al. .......... 235/379 |
| D420,658 S | | 2/2000 | Eyler |
| 6,099,043 A | * | 8/2000 | Story ..................... 281/15.1 |
| 6,196,594 B1 | | 3/2001 | Keller |

OTHER PUBLICATIONS

Identification cards—Recording techique—Part 3: Location of embossed characters on ID–1 cards, ISO/IEC, 7811–3: 1995(E).

Identification cards—Recording technique—Part 4: Location of read–only magnetic tracks—Tracks 1 and 2, ISO/IEC, 7811–4: 1995(E).

Identification cards—Recording technique—Part 5: Location of read–write magnetic track—Track 3, ISO/IEC, 7811–5: 1995(E).

Identification cards—Recording technique—Part 6: Magnetic stripe—High coercivity, ISO/IEC, 7811–6: 2001(E).

Code Facts–Magnetic Stripe Systems—A Primer, Aurora bar code technologies ltd., http://www.dimension–xcom/cf–mag.htm, pp. 1–3 (printed Apr. 4, 2001).

Magnetic Stripe Basics, The AIM Global Network, http://www.aimglobal.org/technologies/card/msbasics.htm, pp. 1–2 (printed Apr. 4, 2001).

Magnetic Stripe Glossary, The AIM Global Network, http://www.aimglobal.org/technologies/card/msglossary.htm, pp. 1–32 (printed Apr. 4, 2001).

Magnetic Stripe FAQ's The AIM Global Network, http://www.aimglobal.org/technologies/card/magnetic_stripe_faqs.htm, pp. 1–6 (printed on Apr. 4, 2001).

Modified Frequency Modulation (MFM)—Encoding for Magnetic Stripes, The AIM Global Network, http://www.aimglobal.org/technologies/card/mfmencoding.htm, pp. 1–4 (printed on Apr. 4, 2001).

Photocopy of grocery discount card (2 pages).

Photocopy of a Metro farecard.

* cited by examiner

DATA CARD

CROSS-REFERENCE TO RELATED APPLICATIONS

This application claims priority under 35 U.S.C. 0119(e) to U.S. Provisional Application No. 60//263,756, filed Jan. 25, 2001 and claims priority under 35 U.S.C. 0120 to U.S. patent application No. 09/611,320, filed Jul. 6, 2000, and to Design Application Nos. 29/141,685, now U.S. Pat. D,453,338, 29/141,652, now U.S. Pat. D,453,337, 29/141,645, now U.S. Pat. D,453,160, 29/141,642, now U.S. Pat. D,456,336, 29/141,688, now U.S. Pat. D,453,161, 29/141,704, now U.S. Pat. D,460,455, 29/141,703, now U.S. Pat. D,453,517, 29/141,691, now U.S. Pat. D,453,516, 29/141,702, now U.S. Pat. D,453,339, 29/141,700, now U.S. Pat. D,456,814, 29/141,699, now U.S. Pat. D,460,454, 29/141,692, 29/141,701, 29/141,693, filed May 11, 2001, and 29/142,203, filed May 22, 2001, the entirety of each of the foregoing applications being incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates generally to data cards, such as credit cards, that contain a magnetic stripe or other means of storing information. More particularly, this invention relates to such cards that are small in size.

2. Related Art

Cards of various kinds have become ubiquitous in modem society. People often carry a number of cards in their wallet or carrying case, including credit cards, ATM or bank cards, debit cards, "smart cards," insurance cards, a driver's license, identification cards, telephone calling cards, transit cards, library cards, and card-entry hotel keys. An increasing number of consumer transactions require use of these cards, for example, as the form of payment, or as identification necessary for another form of payment or admission. Quick and accurate access to certain individual cards is useful and desirable for both the consumer and the vendor of goods or services.

Typically, consumers store credit cards and other types of cards in a wallet or carrying case. These wallets and carrying cases are frequently equipped with sleeves or slots for holding one or more cards in an arrangement selected by the user. Because of the proliferation of the types and numbers of cards carried by consumers, cards are often held very tightly within these sleeves or slots, making retrieval of a particular card difficult. Difficulty in removing a single selected card increases the time necessary for the transaction, causes stored cards to be frequently reshuffled and potentially disorganized, and increases the likelihood that cards will be dropped or lost.

While the number of cards typically carried by consumers is increasing, most consumers use certain types of cards much more frequently than others. For example, some consumers may use a credit card for nearly every sales transaction, but only rarely, if ever, use calling cards, library cards, or insurance cards. Because a subset of the total number of cards carried by consumers must be accessed repeatedly, it is particularly desirable to improve the accessibility of these types of cards.

One way to improve accessibility of frequently used cards is by allowing them to be stored in a separate location from the traditional wallet or carrying case. Such cards could be stored on key-chains, lanyards, hooks, or other similar devices that are easily retrieved from a bag or pocket. Thus, when a consumer needs to use the card during a transaction, the card may be quickly retrieved and given to the merchant. This provides an added level of convenience to the consumer by making the payment process quicker and simpler. Additionally, the merchant is able to move customers through the line more quickly, improving customer satisfaction. An additional benefit of storing frequently used cards on a key-chain or like device is that the possibility that the card will be lost is decreased. This is because a single card is much more easily misplaced than a card attached to a key-chain.

Conventionally sized cards, however, are too large and cumbersome to be conveniently stored on a key-chain or like device. The individual items on a key chain must be small and compact so that the key-chain can accommodate numerous items. Further, key-chains and the like are often placed in the pockets of clothing, which may be small. Finally, larger items, such as conventional credit cards, could be bent or otherwise damaged when stored on a device such as a key-chain. Thus, for a card to be effectively carried on a key-chain, its size must be significantly reduced.

The degree to which conventional cards may be reduced in size, however, is limited by the requirements of standard magnetic stripe card readers, such as point-of-sale ("POS") terminals through which the user "swipes" the card to make a purchase or payment. In order to ensure interoperability between the magnetic stripe readers and cards bearing magnetic stripes, the parameters defining the magnetic stripe are governed by the International Organization for Standardization (ISO) and the International Electrotechnical Commission (IEC). ISO/IEC 7811 provides standards for the physical characteristics of the magnetic stripe including the location of the stripe on the card, the surface profile of the stripe, and the height of the stripe above the card surface. It would be advantageous for a reduced-size card to comply with ISO/IEC 7811, or otherwise be compatible with existing card readers and POS terminals.

Proper functioning of the magnetic stripe is very important. On conventional cards, such as credit cards, magnetic stripes contain encoded information that electronic readers can read to perform a function or confirm identification. For example, on credit and debit cards, the magnetic stripe is usually encoded with specific account information such as the credit card number, cardholder's name, the card expiration date, and a personal identification code. If the electronic device for reading the encoded information cannot properly read the magnetic stripe, the vendor must enter the information manually, using a keypad, telephone, or other similar device. Manually entering the encoded information adds both indirect and direct costs to the vendor. For example, the additional time necessary to enter the information manually may increase needs for register operators and decrease the vendor's ability to attend to other customer matters. In addition, vendors are frequently charged increased transaction fees by the card issuer for a manually entered transaction.

Thus, a need exists for providing cards, such as credit cards, that are reduced in size from currently used cards, and yet still are operable with currently used readers. Such a card would greatly enhance the efficiency of frequent transactions, including sales transactions, by allowing regularly used cards to be readily and easily retrieved. Further, because such a card could be readily stored on a key-chain or like device, the probability that the card would be lost or misplaced is reduced. Finally, because such a card would be compatible with currently used readers, no redesign of existing card reader technology would be required.

BRIEF SUMMARY OF THE INVENTION

In one aspect, the present invention provides a data card that is reduced in size from conventional credit-card-sized cards, and contains an information storage medium, such as a magnetic stripe or a computer chip, that can be read by existing card reader technology.

In another aspect, a reduced-size data card is provided with a magnetic stripe, which is located near an edge of the card, on which data is encoded. Such a magnetic stripe is reduced in size from the magnetic stripes found on conventionally sized cards, and contains data encoded at a higher bit density than on conventionally sized cards. The magnetic stripe is compatible with existing card reader technology.

In yet another aspect, a reduced-size data card is provided with a hole to allow key-chain storage, and the core may be composed, at least in part, of polyester. Additionally, the surface of a data card of the present invention may also be provided with raised dimples or craters to enhance gripability of the card. Further, information may be printed on the surface of the card, in order to reduce or eliminate the need to emboss the card with raised lettering or embossing.

In still another aspect, a reduced-size data card of the present invention may have an angled edge.

DETAILED DESCRIPTION OF THE INVENTION

Reference will now be made to the present preferred embodiments of the invention, examples of which are illustrated in the accompanying drawings.

Figure 1A:
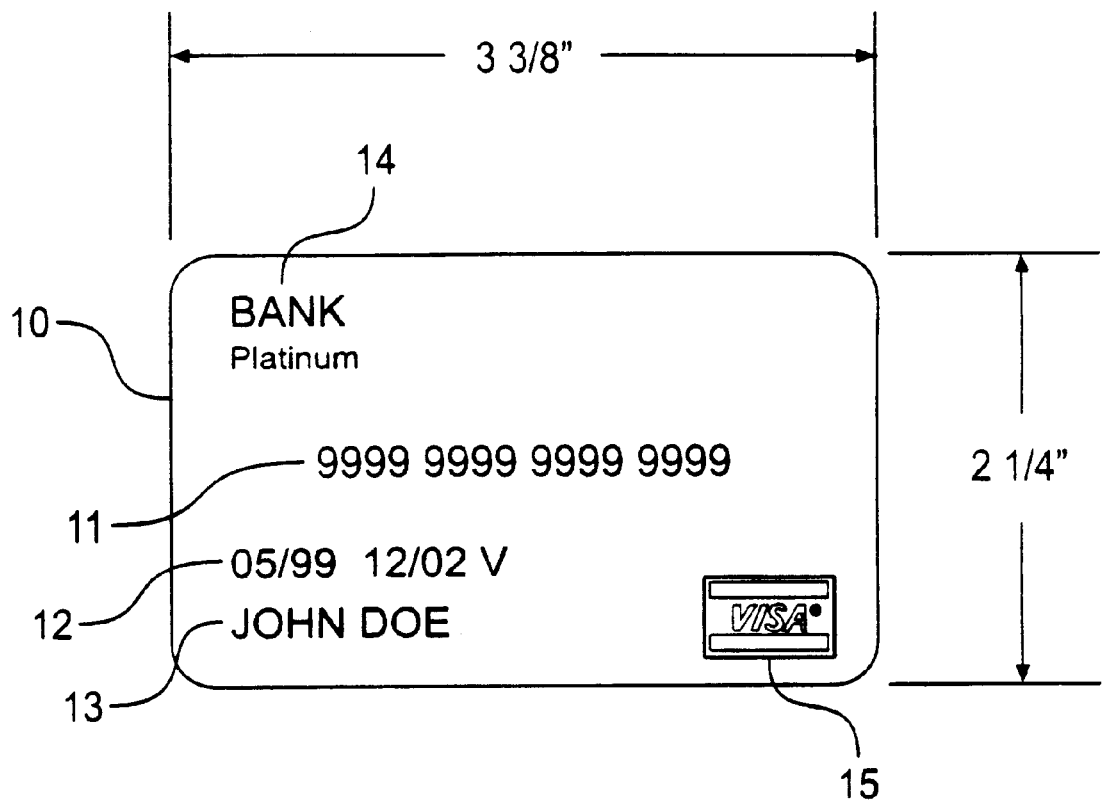
FIG. 1A is an illustration of the front view of a conventional credit card.
Figure 1B:
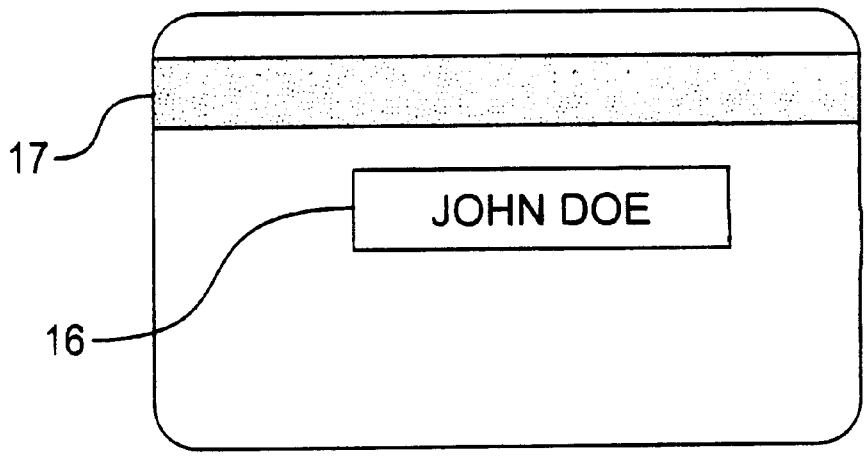
FIG. 1B is an illustration of the back view of a conventional credit card.

FIGS. 1A–B illustrate one embodiment of a conventional credit card. FIG. 1A shows the front side of a conventional standard size credit card 10, which is typically embossed using raised lettering with a credit card number 11, an expiration date 12, and the name of the card-holder 13. Such a card also usually contains the name of the issuing bank 14, and the credit card company, such as American Express®, MasterCard®, or VISA®, 15. It may also contain other information, such as sponsor logos and/or a "platinum" or similar indication. Additionally, the credit card may contain an identification photograph of the card-holder for security purposes. The back side of conventional card 10, shown in FIG. 1B, typically contains a box 16 that can be signed by the card holder, which is used for verification purposes when a purchase is made. Additionally, the back side of card 10 contains a magnetic stripe 17, which runs parallel to the card's largest dimension. Magnetic stripe 17 stores information, such as credit card number, that can be read by conventional point of sale ("POS") terminals. A standard credit card is approximately 3⅜ in. long by 2¼ in. high, for an aspect ratio (length/height) of approximately 1.5, and has a thickness of approximately 0.75 mm.

The card of the present invention includes an information storage medium. By "information storage medium," is meant a medium that is added to the card that stores information in a magnetic, electronic, or electromagnetic manner. This term does not include printed information either affixed to or printed directly on the card. Exemplary information storage media suitable for use with the present invention include, but are not limited to, magnetic stripes and computer chips.

Figure 2A:
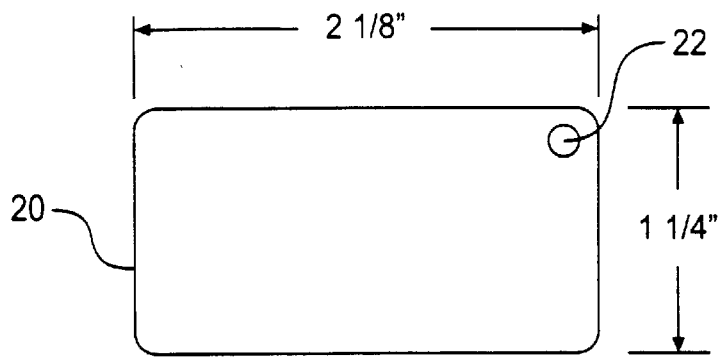
FIG. 2A is an illustration of the front view of one preferred embodiment of the reduced-size data card of the present invention.
Figure 2B:
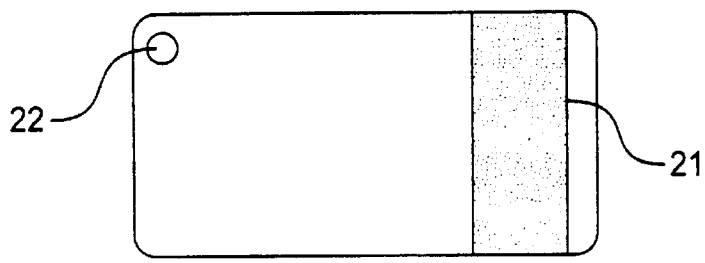
FIG. 2B is an illustration of the back view of the embodiment shown in FIG. 2A.

FIGS. 2A–B depict a preferred embodiment of the present invention, including a generally rectangular card 20, a magnetic stripe 21, and a hole 22. The dimensions of card 20 are approximately 2⅛ in. long by 1¼ in. high, for an aspect ratio (length/height) of approximately 1.7, and a thickness of approximately 0.75 mm. This is a significant reduction from the dimensions of a standard credit card. As would be appreciated by one skilled in the art, the foregoing specific dimensions are representative only, and the present invention is not limited to any particular dimensions. Preferably, the present invention is carried out using cards with dimensions ranging in length from approximately 1 in. to 3 in., and ranging in height from approximately 1 in. to 1⅞ in. Thus, the aspect ratio (length/height) could range from approximately 0.53 (¹⁄₁.₈₇₅) to 3 (3/1).

Magnetic stripe 21 is located on the back side of card 20, as shown in FIG. 2B, and is oriented perpendicularly to the card's largest dimension. Alternatively, the magnetic stripe could be located on the front side of card 20. In one embodiment of the present invention, magnetic stripe 21 is approximately 0.41 in. in width. In another embodiment, shown for example in FIGS. 3A–B, magnetic stripe 31 is approximately 0.25 in. in width.

ISO/IEC 7811 provides standards for the location of the stripe on the card, the surface profile of the stripe, and the height of the stripe above the card surface. Generally, designers of cards attempt to comply with these standards to ensure compatibility with existing POS terminals. Unexpectedly, the card of the present invention is compatible with existing point of sale terminals without complying with several aspects of the ISO/IEC standards, as explained in more detail below.

Finally, hole 22 is shown as located in a corner of card 20, and allows the card to be readily carried on a key-chain or like device. It should be apparent to one skilled in the art that hole 20 can be located anywhere on the card that allows the card to be carried by a key-chain or similar device and does not interfere with the magnetic stripe.

Figure 3A:
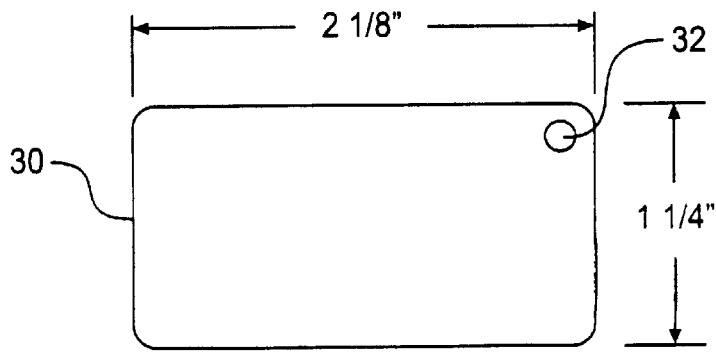
FIG. 3A is an illustration of the front view of another preferred embodiment of the reduced-size data card of the present invention.
Figure 3B:
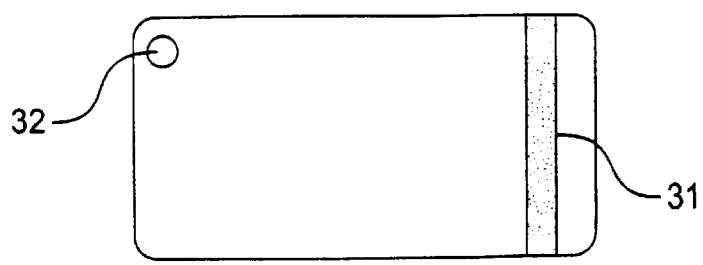
FIG. 3B is an illustration of the back view of the embodiment shown in FIG. 3A.

FIGS. 3A–B show an alternate preferred embodiment. Like the previous embodiment, this embodiment includes a generally rectangular card 30, a magnetic stripe 3 1, that is oriented perpendicularly to the card's largest dimension, and a hole 32. Here, however, magnetic stripe 31 is narrower in width than magnetic stripe 21 of FIG. 2B. A narrower magnetic stripe may be utilized when less information is needed to be stored by the magnetic stripe or when encoding techniques allow more information to be stored in a reduced space.

Figure 4A:
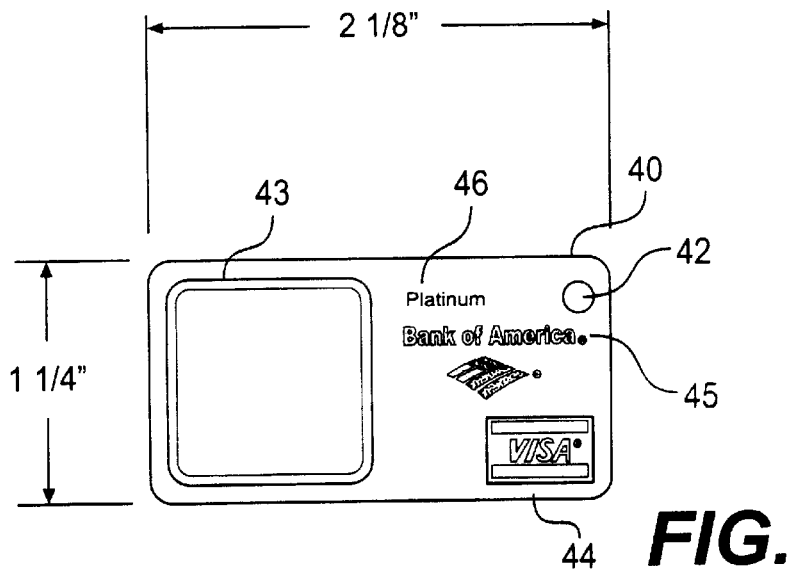
FIG. 4A is an illustration of the front view of another preferred embodiment of the reduced-size data card of the present invention.
Figure 4B:
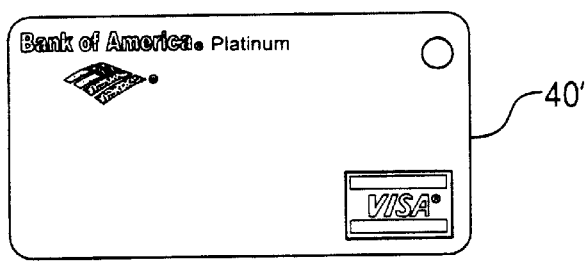
FIG. 4B is an illustration of the front view of another preferred embodiment of the reduced-size data card of the present invention.

FIGS. 4A–D show alternate preferred embodiments. FIG. 4A shows a generally rectangular shaped card 40 with a hole 42. Card dimensions (2⅛ in. by 1¼ in.) are shown on FIG. 4A and art significantly reduced from the standard size credit card. Additionally, card 40 contains an identification photograph 43, various logos 44 and 45, and additional information 46. Further, embossed information, such as credit card number or expiration date (not shown) could be included. Other arrangements of logos, and information should be apparent to one of ordinary skill in the art from this description or from practice. For example, FIG. 4B shows card 40', which is similar to card 40 (FIG. 4A) but without the identification photograph, and with a different arrangement of logos and other information.

Figure 4C:
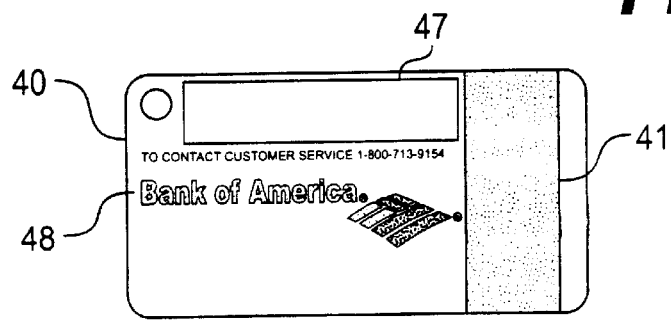
FIG. 4C is an illustration of the back view of the embodiment shown in FIG. 4A.

FIG. 4C shows the back side of card 40, depicted in FIG. 4A, which includes magnetic stripe 41 oriented perpendicularly to the card's largest dimension. Additionally, FIG. 4C includes signature block 47. Signature block 47 is to be signed by the card holder, and is used for signature verification when a purchase is made. Finally, the back side of card 40 may contain logos 48 and other information, as would be apparent to one of ordinary skill in the art.

Figure 4D:
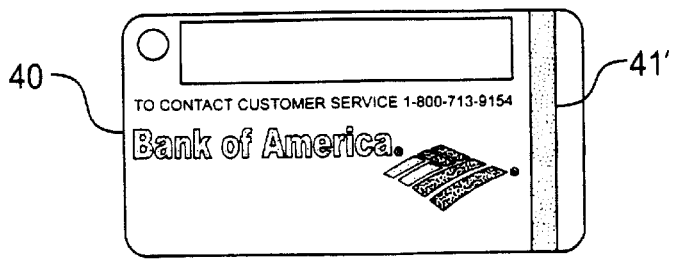
FIG. 4D is an illustration of an alternate back view of the embodiment shown in FIG. 4A.

FIG. 4D shows an alternate arrangement of the back side of card 40. It shows magnetic stripe 41' which is narrower than magnetic stripe 41 of FIG. 4C. Narrower magnetic stripes may be utilized when less information is required to be stored by the magnetic stripe, or when encoding techniques allow more information to be stored in less space.

Figure 5A:
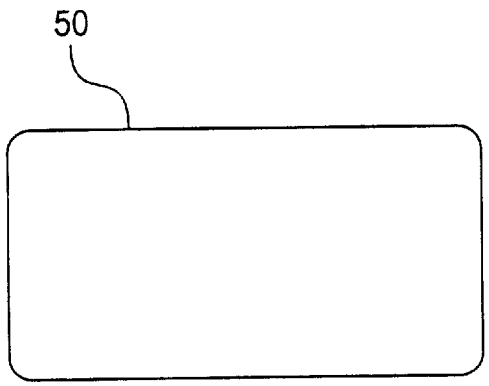
FIG. 5A is an illustration of the front view of another preferred embodiment of the reduced-size data card of the present invention.
Figure 5B:
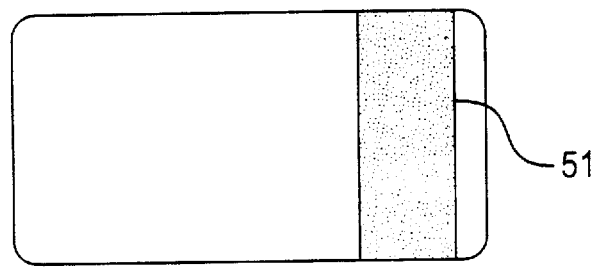
FIG. 5B is an illustration of the back view of the embodiment shown in FIG. 5A.

FIGS. 5A–B show an alternate preferred embodiment, including a generally rectangular shaped card 50 and a magnetic stripe 51, oriented perpendicularly to the card's largest dimension. Unlike previous embodiments, the present embodiment does not contain a hole. While a hole is a helpful way to attach a card of the present invention to a key-chain or like device, such a hole is not required. Thus, the card can be attached to the key-chain by a clip or similar device. Additionally, the card of the present invention is not required to be stored on a key-chain or like device and could be stored in any fashion chosen by the consumer, such as directly in the consumer's pocket or bag. It should be readily apparent to one skilled in the art that any of the embodiments described herein could be modified such that the hole is removed.

Figure 6A:
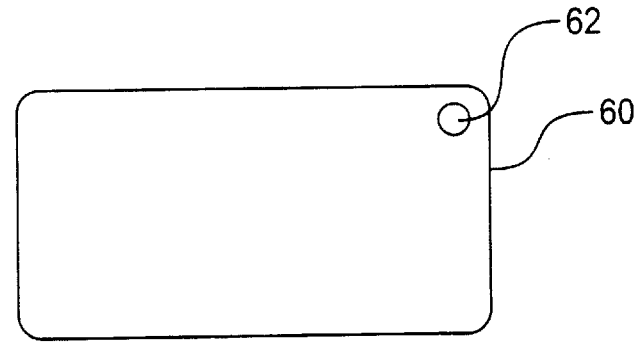
FIG. 6A is an illustration of the front view of another preferred embodiment of the reduced-size data card of the present invention.
Figure 6B:
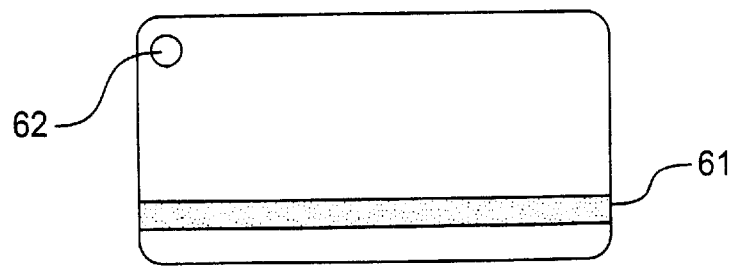
FIG. 6B is an illustration of the back view of the embodiment shown in FIG. 6A.

FIGS. 6A–B show still another alternate preferred embodiment, including a generally rectangular shaped card 60, a magnetic stripe 61, and a hole 62. Magnetic stripe 61 is oriented parallel to the card's largest dimension. As described above, magnetic stripe 61 is preferably compatible with existing magnetic stripe readers. Magnetic stripe 61 may be either narrow or wide, depending on the amount of data required to be stored and the degree of data compression. Because magnetic stripe 61 is oriented parallel to the card's longest dimension, it may be capable of storing a greater amount of information at a given width than magnetic stripe 21 of FIG. 2B which is oriented perpendicularly to the card's largest dimension. Thus, the present embodiment may be more easily implemented when greater amounts of information storage is required. It should be readily apparent to one of ordinary skill in the art that any of the embodiments described herein could be modified such that the magnetic stripe is oriented parallel to the card's largest dimension.

Conventional credit cards and the like have been generally rectangular in shape. However, the card of the present invention may take on other shapes. For example, the card could be any number of geometric shapes such as triangular or trapezoidal. Additionally, the card could take on the shape of naturally occurring or human-made objects, such as pine trees or airplanes. Such shapes could be related to the card issuer or sponsor. Thus, a credit card that a consumer can use to accrue frequent flier miles could be in the shape of an airplane. The dimensions of such cards generally comport with the size guidelines suggested herein. Because such cards are not rectangular, the magnetic stripe would not necessarily be oriented as described above (either parallel to or perpendicular to the card's largest dimension). Thus, the magnetic stripe could be oriented in any number of ways, depending on the shape of the card.

Additionally, any of the embodiments described herein could be provided with a tread to increase the gripability of the card. Such treads are described in detail in U.S. patent application Ser. No. 09/611,320 filed on Jul. 6, 2000, the entirety of which is hereby incorporated by reference.

Figure 7A:
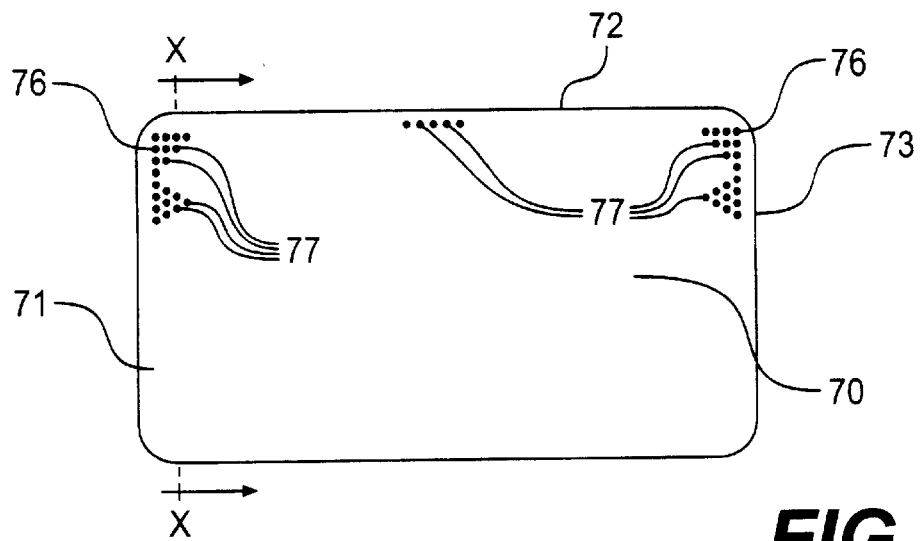
FIG. 7A is an illustration of the front view of another preferred embodiment of the reduced-size data card of the present invention.
Figure 7B:
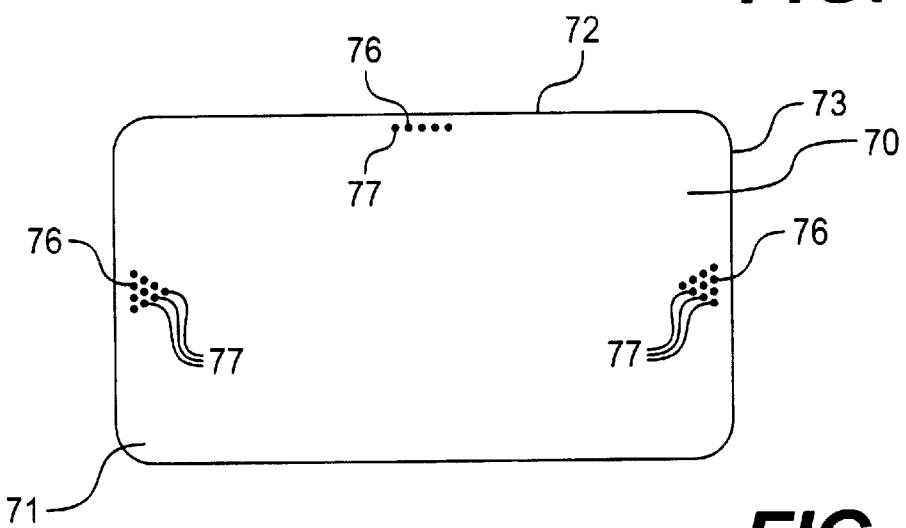
FIG. 7B is an illustration of the front view of another preferred embodiment of the reduced data card of the present invention.
Figure 7C:
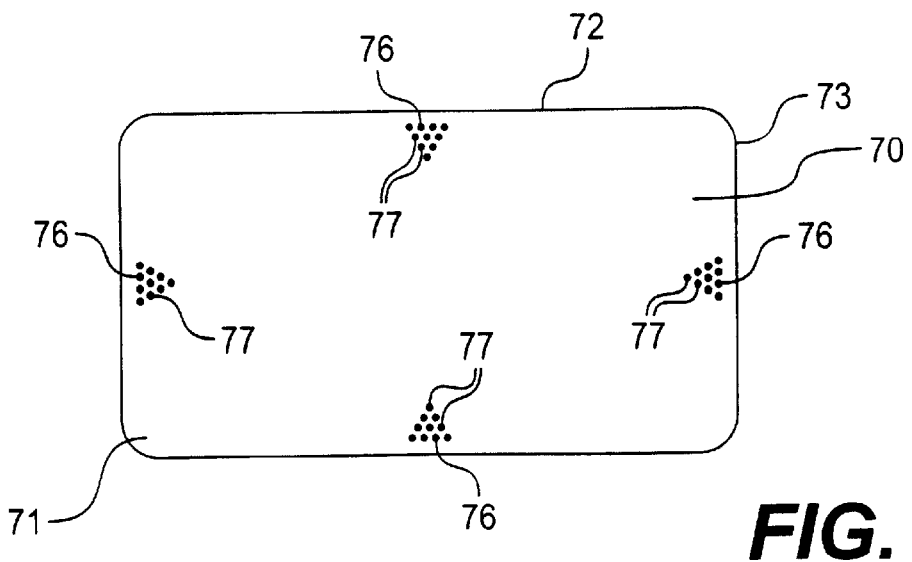
FIG. 7C is an illustration of the front view of another preferred embodiment of the reduced-size data card of the present invention.

These treads could take the form of a plurality raised dimples disposed on a surface of the card. The treads are preferably disposed on the surface or face of the card that comes into contact with the user to increase gripability. FIGS. 7A–C show three alternate preferred embodiments of the present invention in which the surface of the card is provided with treads. In each a number of dimples 77 is arranged to form a plurality of treads 76 on the front face 71 of card 70. In FIG. 7A, the dimples 77 are arranged to form treads 76 in either a triangular pattern or a line. The dimples 77, however, can also be arranged in any number of patterns. As depicted in FIGS. 7A–7C, the treads 76 are located near an edge 73 of card 70, and in each preferred embodiment depicted in FIGS. 7A–7C, a tread 76 is located near the top edge 72 of the card 70. Other arrangements of dimples 77 forming treads 76 should be apparent to one of skill in the art from this description of from practice of the invention depending on the intended or experienced use of the card.

Figure 8A:
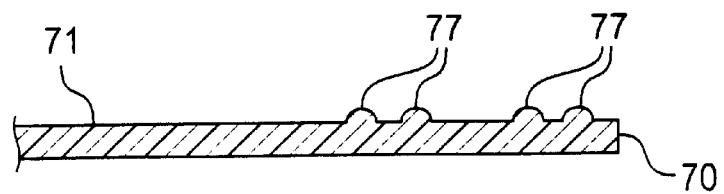
FIG. 8A is a partial sectional view of another preferred embodiment of the reduced-size data card of the present invention taken through the tread where the tread includes raised dimples.

FIG. 8A shows a sectional view of a preferred embodiment of card 70 of the present invention taken along the line X—X of FIG. 7A, in which the dimples 77 are raised from the front face 71 of the card 70. In such an embodiment, the height of each dimple should be selected so as not to interfere with the proper operation of POS terminals or other devices that require the card to be swiped by or through the device.

Figure 8B:
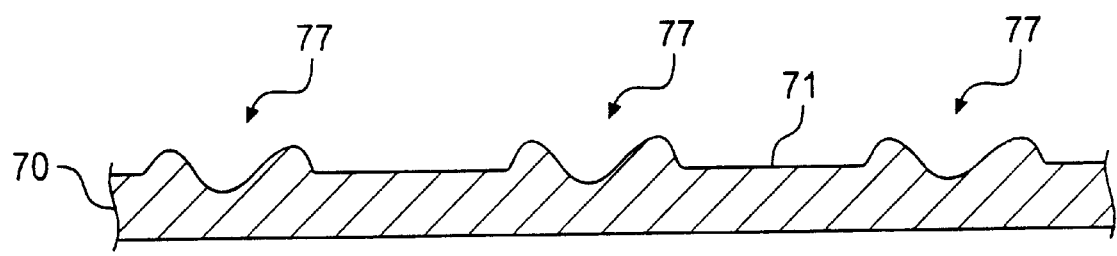
FIG. 8B is a partial sectional view of another preferred embodiment of the reduced-size data card of the present invention taken through the tread where the tread includes craters.

FIG. 8B shows a sectional view of an alternate preferred embodiment of card 70 of the present invention. In this embodiment, the dimples are created in such a manner as to create individual craters 77 in which the lip of the crater is raised slightly above the front surface 71 of the card 70, while the center of the crater is slightly below the surface of the card.

While the specific embodiments described herein are cards having magnetic stripes such as credit cards, debit cards, and bank cards, this is by way of example, and the invention is not limited to these types of cards. Thus, the present invention can be implemented for many different types of data cards including Smart Cards (i.e. cards containing computer chips that store information), stored value cards, proximity chip cards, and other cards that are capable of storing information. A detailed discussion of data cards containing embedded computer chips may be found in U.S. Pat. No. 4,443,027 to McNeely et al., the entirety of which is hereby incorporated by reference. As described in McNeely et al, information for identifying the authorized credit-card user or providing credit authorization comprises a microprocessor, computer or integrated circuit chip embedded in the card. McNeely et al., col. 3, lines 30–34.

Figure 9A:
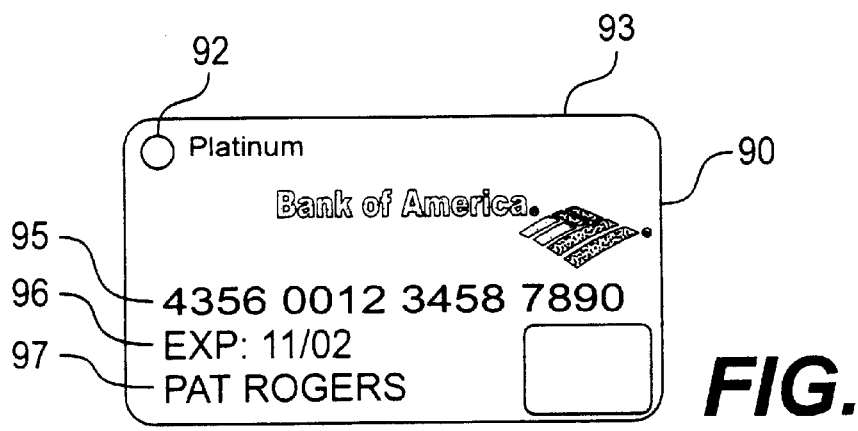
FIG. 9A is an illustration of the front view of another preferred embodiment of the reduced-size data card of the present invention.
Figure 9B:
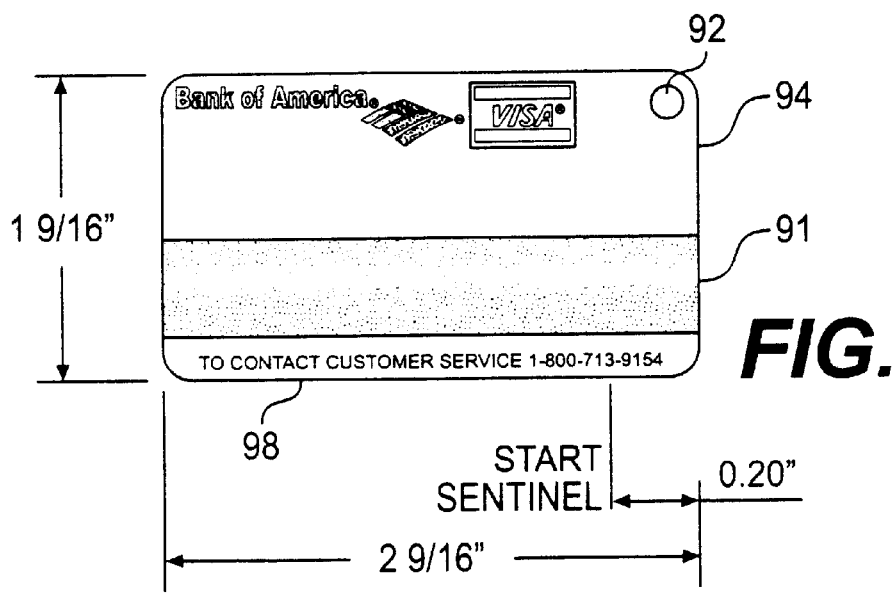
FIG. 9B is an illustration of the back view of the embodiment shown in FIG. 9A.

Another preferred embodiment of the present invention will now be described in greater detail. This preferred embodiment, shown in FIGS. 9A–C, includes a generally rectangular card 90, a magnetic stripe 91, and a hole 92. The front face 93 of card 90 is shown in FIG. 9A; the rear face 94 of card 90 is shown in FIG. 9B. Approximate dimensions of card 90, as indicated on FIG. 9B, are 1 9/16 inches (height) by 2 9/16 inches (length). The width of the card, shown in FIG. 9C (not to scale), is approximately 0.75 mm. These height and length dimensions are reduced from conventionally-sized credit card dimensions, which are approximately 2 1/4 inches (height) by 3 3/8 inches (length).

Once again, the specific dimensions of card 90 are representative only, and the present invention is not limited to any particular dimensions. Nevertheless, the present invention is preferably carried out using cards with dimensions ranging from approximately 1 inch by 1 inch to approximately 1 7/8 inches to 3 inches.

The front face 93 of card 90 contains various information such as card number 95, expiration date 96, and card-holder name 97. This information may be embossed on the card. In a preferred embodiment, the card is free from or devoid of embossing or other raised lettering. In such an embodiment, the information may be printed on the card using laser printing techniques, as are known in the art.

Figure 9C:
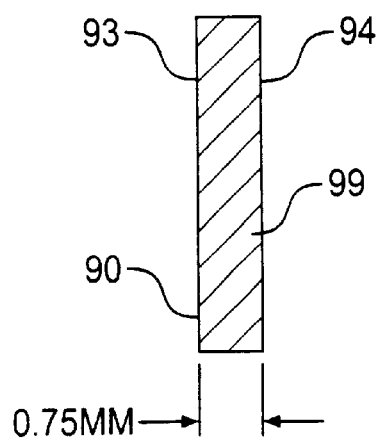
FIG. 9C is an illustration of a side view of the embodiment shown in FIG. 9A.

Between front and rear faces 93 and 94 of card 90 is a core 99, as shown in FIG. 9C. This core may be composed of, at least in part, polyester. In one embodiment, the core is composed of 80% polyester and 20% polyvinyl chloride (PVC). The use of polyester in the core is advantageous because it increases the durability of the card. As would be apparent to one skilled in the art, various percentages of polyester and other materials may be used for the card core.

In the embodiment shown in FIGS. 9A–C, magnetic stripe 91 is positioned parallel to the bottom edge 98 of card 90. The bottom edge, of course, is defined with respect to the particular card orientation shown in FIG. 9B. As would be readily apparent to one skilled in the art, rotation of card 90 could cause "bottom" edge 98 to appear as if it is a right, left, or top edge. Magnetic stripe 91 is used to store encoded data such as the name of the card-holder, a credit card or other account number, card expiration date, and a personal identification code or other security information. The lengthwise dimension of magnetic stripe 91 is approximately 2 9/16 inches. As defined herein, the lengthwise dimension of a magnetic stripe is the largest dimension of the magnetic stripe. However, as described above, the present invention is not limited to any particular dimensions. Preferably, the lengthwise dimension of the magnetic stripe ranges from approximately 1 inch to approximately 3 inches.

The requirements of ISO/IEC 7811, which specifies the international standards for magnetic stripes will now be discussed, and then compared to the characteristics of magnetic stripe 91 of the present invention. Designers of cards bearing magnetic stripes attempt to comply with the standards set forth in ISO/IEC 7811 in order to ensure compatibility and interoperability with current magnetic stripe readers and POS terminals.

Figure 10:
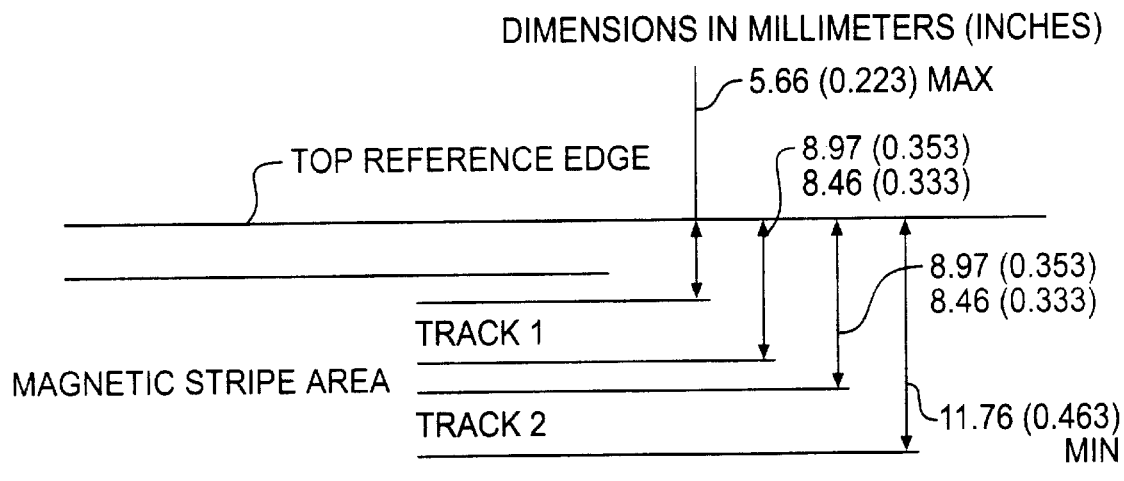
FIG. 10 is an illustration of the ISO/IEC 7811 standards for location and width of magnetic stripe data tracks 1 and 2.
Figure 11:
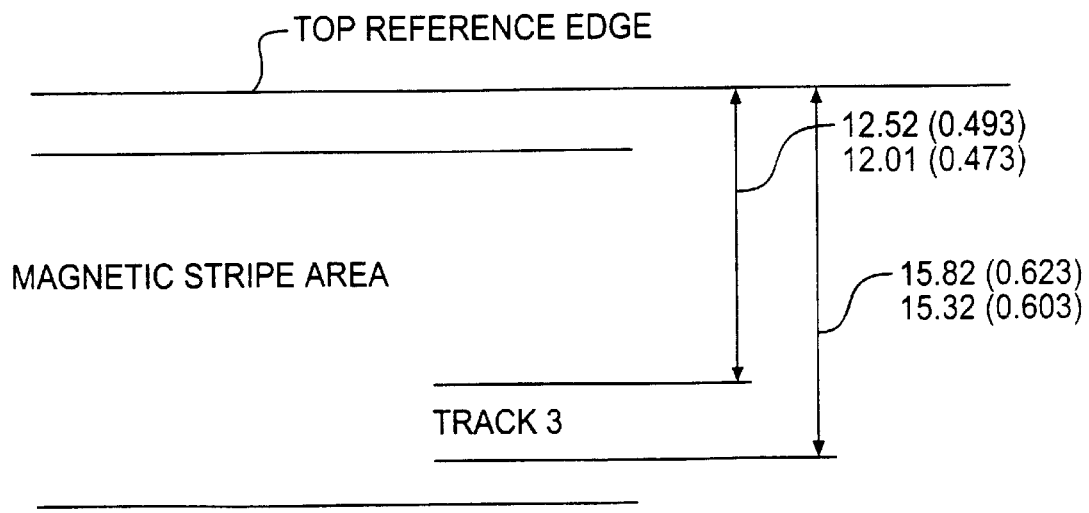
FIG. 11 is an illustration of the ISO/IEC 7811 standards for location and width of magnetic stripe data track 3.

ISO/IEC 7811 specifies that a magnetic stripe may contain up to three tracks of encoded information. As will be appreciated by one skilled in the art, each track is essentially a strip of specified width and location running the length of the magnetic stripe, on which data is encoded. According to ISO/IEC 7811, track 1 is located closest to the edge of the card and contains data encoded at 210 bits per inch (bpi). Track 2 is adjacent to track 1 and contains data encoded at 75 bpi. FIG. 10 shows the width and location of tracks 1 and 2 as specified by ISO/IEC 7811-4, the entirety of which is hereby incorporated by reference. Track 3 is the furthest from the edge of the card and contains data encoded at 210 bpi. FIG. 11 shows the width and location of track 3 as specified by ISO/IEC 7811-5, the entirety of which is hereby incorporated by reference.

In all cases, data is encoded on the tracks using two-frequency encoding, as specified in ISO/IEC 7811. As will be understood by one skilled in the art, two-frequency encoding involves the use of flux transitions to encode data. The encoding comprises data and clocking transitions together. The presence of a flux transition between clocking transitions signifies that the bit is a "one;" the absence of a flux transition signifies a "zero." Additional detailed discussion of two-frequency encoding may be found in ISO/IEC 7811-2 and 7811-6, the entirety of which is incorporated herein by reference.

Figure 12:
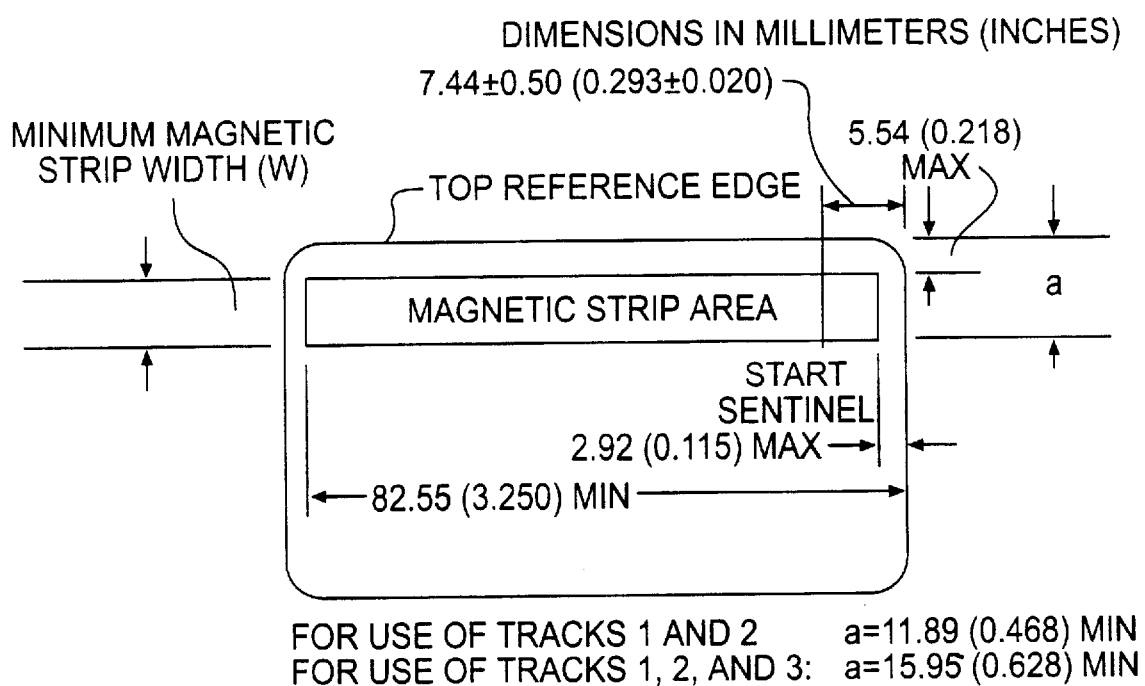
FIG. 12 is an illustration of the ISO/IEC 7811 standards for magnetic stripe location and size.

Each track of data contains a "start sentinel." The start sentinel is the first data bit, and indicates the beginning of the encoded data on each track. As shown in FIG. 12, ISO/IEC 7811 specifies that the location of the start sentinel is approximately 0.293 inches from the right side of the card for all tracks.

FIG. 12 shows additional physical characteristics for magnetic stripes, as specified by ISO/IEC 7811. The minimum length of the magnetic stripe is specified as 3.135 inches (3.250 inches minimum from the right edge of the card to the left edge of the stripe minus the 0.115 inches maximum from the right edge of the card to the right edge of the stripe). The minimum width of the magnetic stripe is 0.25 inches for cards using tracks 1 and 2, and 0.41 inches for cards using all three tracks.

Magnetic stripe 91 (FIG. 9B) is different in several respects from the magnetic stripes specified by ISO/IEC 7811. First, the length of magnetic stripe 91 is approximately 2 9/16 inches, significantly shorter than the 3.135 inch minimum length specified by ISO/IEC 7811.

Second, the data on magnetic stripe 91 is encoded at bit densities higher than those prescribed in ISO/IEC 7811. Magnetic stripe 91 contains data encoded on tracks 1 and 2. In order to ensure that sufficient data is encoded in the smaller magnetic stripe area, data is encoded on track 1 at 260 bpi and on track 2 at 100 bpi. Both of these bit densities are significantly higher than those specified in ISO/IEC 7811 for tracks 1 and 2 (210 bpi and 75 bpi, respectively). As should be appreciated by one skilled in the art, data could also be encoded on track 3 if necessary or desirable in a particular circumstance. It should also be noted that the present invention is not limited by these specific bit densities, and other bit densities could be selected that ensure the storage of the appropriate amount of information in the available space.

Also, as shown in FIG. 9B, the start sentinel of magnetic stripe 91 is located 0.200 inches from the right edge of card 90. This start sentinel location is significantly different from that specified in ISO/IEC 7811, which specifies that the start sentinel must be located 0.293 inches from the right edge of the card.

Preferably, the data on tracks 1 and 2 of magnetic stripe 91 is encoded using standard two-frequency encoding. However, it should be understood by one skilled in the art that the present invention is not limited to a particular encoding technique. Preferably, the width of each track and the distance of each track from the bottom edge 98 of card 90 complies with the requirements of ISO/IEC 7811, as described above and shown in FIG. 10.

The dimensions of card 90 itself are different from the dimensions specified in ISO/IEC 7810, the entirety of which is hereby incorporated by reference, which generally specifies physical parameters of identification cards. Notably, ISO/IEC 7810 establishes minimum dimensions for identification cards at 2.125 inches by 3.370 inches. The dimensions of card 90 are approximately 1 9/16 inches by 2 9/16 inches.

Given that card 90 of the present invention does not comply with numerous standards and specifications set forth in ISO/IEC 7810 and 7811, it would be expected by those skilled in the art that the card would not be operable with standard magnetic stripe readers and POS terminals. However, tests performed on prototype cards indicate that the data cards of the present invention are compatible with standard equipment.

In order to test the prototype cards, twenty-five cards, substantially similar to that shown in FIGS. 9A and 9B and described above, were assembled and encoded with twenty-five different accounts. These twenty-five cards were then tested using five different POS terminals. The five POS terminals were standard merchant POS terminals manufactured by VeriFone Inc. A number of the twenty-five cards were tested on each of the five POS terminals. In order to ensure proper reading of the card, two tests were performed. First, after swiping each test card through the terminal, the terminal attempted to print a receipt showing, among other things, the name associated with the account encoded on each card. Second, the terminal used the data obtained from the card, and attempted to access the interchange system and obtain authorization for a transaction. All tested cards passed both tests. This testing indicates that the data card of the present invention is unexpectedly compatible with POS terminals, despite the non-compliance with numerous aspects of ISO/IEC 7810 and 7811.

Figure 13A:
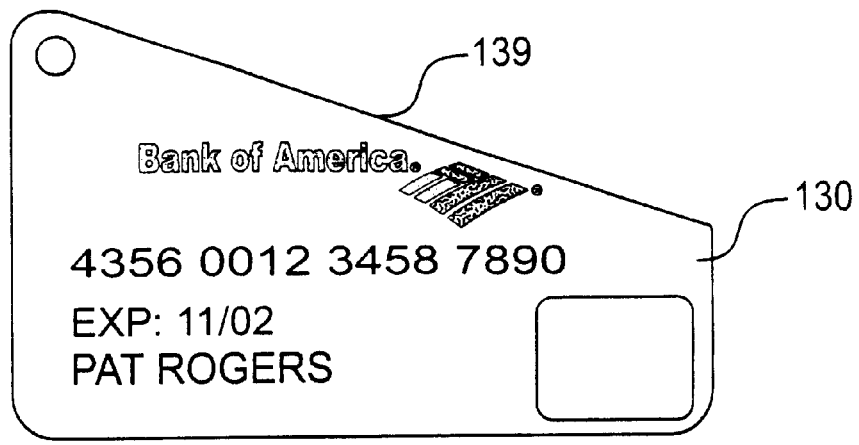
FIG. 13A is an illustration of the front view of another preferred embodiment of the reduced-size data card of the present invention.
Figure 13B:
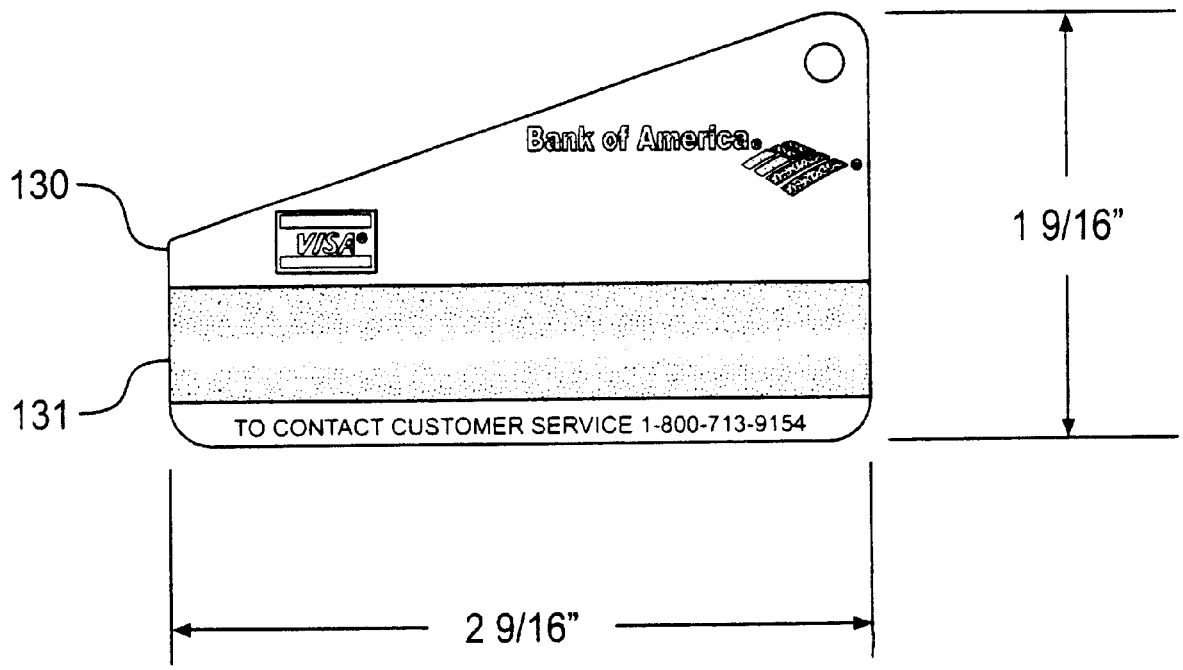
FIG. 13B is an illustration of the back view of the embodiment shown in FIG. 13A.

Additional testing was carried out using cards similar to card 130, shown in FIGS. 13A and 13B. Card 130 differs from card 90 only in that edge 139 of card 130 is angled. The same testing protocol described above was performed on twenty-five cards substantially similar to card 130 as shown in FIGS. 13A and B. The magnetic stripe 131 on card 130 is substantially the same as magnetic stripe 91 of card 90 (FIG. 9B). All cards tested passed both the receipt and authorization tests.

Thus, testing the prototype cards of various embodiments reveals that cards of the present invention are interoperable with magnetic card reader technology and POS terminals despite non-compliance with several of the relevant ISO/IEC standards.

Now will be described a method of use for a reduced-size data card of the present invention. As described above, such a card may be stored on a key-chain, lanyard, hook or similar device. Alternatively, the card may simply be placed in the pocket or bag of a consumer. When a consumer carrying a card of the present invention approaches a POS terminal or other card reader, such as when making sales transaction, the consumer may be required to produce the card to complete the transaction. Because of the convenience of storage, the consumer quickly and easily retrieves the card, and either gives the card to the merchant to "swipe" through the reader, or the consumer may be permitted to "swipe" the card him/herself. The POS terminal or other card reader then "reads" the encoded information on the card, such as card number, credit limit or the like, and the transaction is completed. The card may then be restored by the consumer until the next usage.

Although particular embodiments of the invention have been described and illustrated herein, it is recognized that modifications and variations may readily occur to those skilled in the art, and consequently it is intended that the claims be interpreted to cover such modifications and equivalents.

What is claimed as new and desired to be protected by Letters Patent of the United States is:

1. A data card comprising a first face, a second face, and a magnetic stripe comprising stored encoded data, wherein the dimensions of the card are in the range of about 1 inch by about 1 inch to about 1⅞ inches by about 3 inches, and the lengthwise dimension of the magnetic stripe is in the range of about 1 inch to about 3 inches, and wherein the encoded data can be read by a magnetic stripe reader configured to read magnetic stripes compliant with ISO/IEC 7811.

2. A data card as in claim 1, wherein the magnetic stripe is positioned parallel to an edge of the card.

3. A data card as in claim 1, wherein the magnetic stripe is positioned perpendicular to a largest dimension of the card.

4. A data card as in claim 1, wherein the magnetic stripe comprises two tracks for storing the encoded data.

5. A data card as in claim 4, wherein the encoded data on a first of the two tracks is encoded at greater than about 210 bits per inch.

6. A data card as in claim 5, wherein the encoded data on the first of the two tracks is encoded at about 260 bits per inch.

7. A data card as in claim 4, wherein the encoded data on a second of the two tracks is encoded at greater than about 75 bits per inch.

8. A data card as in claim 7, wherein the encoded data on the second of the two tracks is encoded at about 100 bits per inch.

9. A data card as in claim 1, wherein the encoded data is encoded using two-frequency encoding.

10. A data card as in claim 1, wherein the first and second faces define a hole therethough.

11. A data card as in claim 1, further comprising a core disposed between said first and second faces, wherein said core comprises polyester.

12. A data card as in claim 11, wherein said core comprises about 80% polyester.

13. A data card as in claim 1, wherein the dimensions of the card are about 1 9/16 inches by about 2 9/16 inches.

14. A data card as in claim 1, wherein the first and second faces are devoid of raised lettering.

15. A data card as in claim 1, further comprising a computer chip.

16. A data card as in claim 1, further comprising an integrated circuit chip.

17. A data card as in claim 1, further comprising a microprocessor.

18. A data card as in claim 1, further comprising a tread comprising a plurality of raised dimples for improving the gripability of said card, wherein said plurality of raised dimples are disposed on one of said first and second faces, said one face coming into contact with a user to improve gripability.

19. A data card as in claim 1, further comprising a plurality of craters disposed on one of said first and second faces, each of said plurality of craters comprising: a lip and a center, and wherein the lip of each crater is raised slightly about said one face, and the center is indented slightly into said one face.

20. A data card comprising a first face, a second face, and a magnetic stripe comprising stored encoded data, wherein the largest dimension of the card is about 2 9/16 inches, and the lengthwise dimension of the magnetic stripe is in the range of about 1 inch to about 2 9/16 inches, and wherein the encoded data can be read by a magnetic stripe reader configured to read magnetic stripes compliant with ISO/IEC 7811.

21. A data card as in claim 20, wherein the magnetic stripe is positioned parallel to an edge of the card.

22. A data card as in claim 20, wherein the magnetic stripe comprises two tracks for storing the encoded data.

23. A data card as in claim 22, wherein the encoded data on a first of the two tracks is encoded at greater than about 210 bits per inch.

24. A data card as in claim 23, wherein the encoded data on the first of the two tracks is encoded at about 260 bits per inch.

25. A data card as in claim 22, wherein the encoded data on a second of the two tracks is encoded at greater than about 75 bits per inch.

26. A data card as in claim 25, wherein the encoded data on the second of the two tracks is encoded at about 100 bits per inch.

27. A data card as in claim 20, wherein the encoded data is encoded using two-frequency encoding.

28. A data card as in claim 20, wherein the first and second faces define a hole therethough.

29. A data card as in claim 20, further comprising a core disposed between said first and second faces, wherein said core comprises polyester.

30. A data card as in claim 29, wherein said core comprises about 80% polyester.

31. A data card as in claim 20, wherein the lengthwise dimension of the magnetic stripe is about 2 9/16 inches.

32. A data card as in claim 20, wherein the first and second faces are devoid of raised lettering.

33. A data card as in claim 20, further comprising a computer chip.

34. A data card as in claim 20, further comprising an integrated circuit chip.

35. A data card as in claim 20, further comprising a microprocessor.

36. A data card as in claim 20, further comprising a tread comprising a plurality of raised dimples for improving the gripability of said card, wherein said plurality of raised dimples are disposed on one of said first and second faces, said one face coming into contact with a user to improve gripability.

37. A data card as in claim 20, further comprising a plurality of craters disposed on one of said first and second faces, each of said plurality of craters comprising: a lip and a center, and wherein the lip of each crater is raised slightly about said one face, and the center is indented slightly into said one face.

38. A data card as in claim 20, further comprising an angled edge.

39. A data card comprising a first face, a second face, an angled edge, and a magnetic stripe comprising stored encoded data, wherein the largest dimension of the card is in the range of about 1⅞ inches to about 3 inches, and the lengthwise dimension of the magnetic stripe is in the range of about 1 inch to about 3 inches, and wherein the encoded data can be read by a magnetic stripe reader configured to read magnetic stripes compliant with ISO/IEC 7811.

40. A data card as in claim 39, wherein the magnetic stripe is positioned parallel to an edge of the card.

41. A data card as in claim 39, wherein the magnetic stripe is positioned perpendicular to a largest dimension of the card.

42. A data card as in claim 39, wherein the magnetic stripe comprises two tracks for storing the encoded data.

43. A data card as in claim 42, wherein the encoded data on a first of the two tracks is encoded at greater than about 210 bits per inch.

44. A data card as in claim 43, wherein the encoded data on the first of the two tracks is encoded at about 260 bits per inch.

45. A data card as in claim 42, wherein the encoded data on a second of the two tracks is encoded at greater than about 75 bits per inch.

46. A data card as in claim 45, wherein the encoded data on the second of the two tracks is encoded at about 100 bits per inch.

47. A data card as in claim 39, wherein the encoded data is encoded using two-frequency encoding.

48. A data card as in claim 39, wherein the first and second faces define a hole therethough.

49. A data card as in claim 39, further comprising a core disposed between said first and second faces, wherein said core comprises polyester.

50. A data card as in claim 49, wherein said core comprises about 80% polyester.

51. A data card as in claim 39, wherein the first and second faces are devoid of raised lettering.

52. A data card as in claim 39, further comprising a computer chip.

53. A data card as in claim 39, further comprising an integrated circuit chip.

54. A data card as in claim 39, further comprising a microprocessor.

55. A data card as in claim 39, further comprising a tread comprising a plurality of raised dimples for improving the gripability of said card, wherein said plurality of raised dimples are disposed on one of said first and second faces, said one face coming into contact with a user to improve gripability.

56. A data card as in claim 39, further comprising a plurality of craters disposed on one of said first and second faces, each of said plurality of craters comprising: a lip and a center, and wherein the lip of each crater is raised slightly about said one face, and the center is indented slightly into said one face.

57. A data card as in claim 39, wherein the magnetic stripe is positioned parallel to said angled edge.

* * * * *

(12) INTER PARTES REEXAMINATION CERTIFICATE (0127th)
United States Patent
Pentz et al.

(10) Number: US 6,471,127 C1
(45) Certificate Issued: Dec. 22, 2009

(54) DATA CARD

(75) Inventors: Jamlly Pentz, Tega Cay, SC (US);
Emmet Burns, Charlotte, NC (US);
Richard J. Collins, Highland Park, IL (US); R. Bruce Montgomery, Charlotte, NC (US); A. Allen Kendle, Charlotte, NC (US)

(73) Assignee: Bank of America Corporation, Charlotte, NC (US)

Reexamination Request:
No. 95/000,035, Feb. 9, 2004

Reexamination Certificate for:
Patent No.: 6,471,127
Issued: Oct. 29, 2002
Appl. No.: 09/988,151
Filed: Nov. 19, 2001

Related U.S. Application Data

(63) Continuation of application No. 29/142,203, filed on May 22, 2001, now Pat. No. Des. 462,966, which is a continuation of application No. 29/141,699, filed on May 11, 2001, now Pat. No. Des. 460,454, which is a continuation of application No. 29/141,693, filed on May 11, 2001, now Pat. No. Des. 462,965, which is a continuation of application No. 29/141,700, filed on May 11, 2001, now Pat. No. Des. 456,814, which is a continuation of application No. 29/141,701, filed on May 11, 2001, now Pat. No. Des. 461,477, which is a continuation of application No. 29/141,692, filed on May 11, 2001, now Pat. No. Des. 467,247, which is a continuation of application No. 29/141,702, filed on May 11, 2001, now Pat. No. Des. 453,339, which is a continuation of application No. 29/141,691, filed on May 11, 2001, now Pat. No. Des. 453,516, which is a continuation of application No. 29/141,703, filed on May 11, 2001, now Pat. No. Des. 453,517, which is a continuation of application No. 29/141,704, filed on May 11, 2001, now Pat. No. Des. 460,455, which is a continuation of application No. 29/141,688, filed on May 11, 2001, now Pat. No. Des. 453,161, which is a continuation of application No. 29/141,642, filed on May 11, 2001, now Pat. No. Des. 453,336, which is a continuation of application No. 29/141,645, filed on May 11, 2001, now Pat. No. Des. 453,160, which is a continuation of application No. 29/141,652, filed on May 11, 2001, now Pat. No. Des. 453,337, which is a continuation of application No. 29/141,685, filed on May 11, 2001, now Pat. No. Des. 453,338, which is a continuation of application No. 09/611,320, filed on Jul. 6, 2000.

(60) Provisional application No. 60/263,756, filed on Jan. 25, 2001.

(51) Int. Cl.
*G06K 13/063* (2006.01)
*G06K 19/04* (2006.01)
*G06K 19/06* (2006.01)
*B42D 15/10* (2006.01)

(52) U.S. Cl. ........................................ 235/487; 235/493
(58) Field of Classification Search .................. None
See application file for complete search history.

(56) References Cited

U.S. PATENT DOCUMENTS

| | | |
|---|---|---|
| 3,537,195 A | 11/1970 | Gerds |
| 4,443,027 A | 4/1984 | McNeely |
| 4,645,916 A | 2/1987 | Raisleger |
| 4,978,146 A | 12/1990 | Warther et al. |

(Continued)

FOREIGN PATENT DOCUMENTS

CA 2300241 A1 9/2000

OTHER PUBLICATIONS

U.S. Appl. No. 29/196,616, filed Dec. 31, 2003, Allison M. Hart et al.

(Continued)

*Primary Examiner*—Ovidio Escalante

(57) ABSTRACT

A data card is reduced in size from the conventional standard size credit card. Accessibility of the card is enhanced because the card may be stored in a separated location from conventionally sized cards, such as on a key-chain or similar device. The card of the present invention has a means for storing information, such as a magnetic stripe or computer chip.

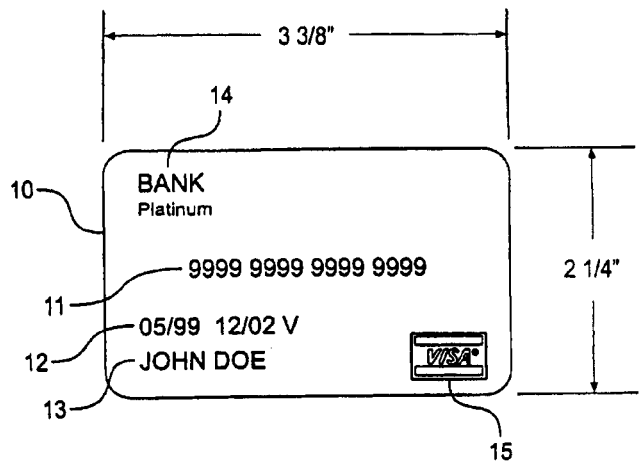

U.S. PATENT DOCUMENTS

| | | | |
|---|---|---|---|
| 5,204,513 A | | 4/1993 | Steele |
| 5,495,981 A | | 3/1996 | Warther |
| 5,769,457 A | | 6/1998 | Warther |
| 5,834,756 A | * | 11/1998 | Gutman et al. ............... 235/493 |
| 5,863,076 A | | 1/1999 | Warther |

OTHER PUBLICATIONS

U.S. Appl. No. 29/196,609, filed Dec. 31, 2003, Allison M. Hart et al.

U.S. Appl. No. 29/196,577, filed Dec. 31, 2003, Allison M. Hart et al.

U.S. Appl. No. 29/196,576, filed Dec. 31, 2003, Allison M. Hart et al.

U.S. Appl. No. 29/196,573, filed Dec. 31, 2003, Allison M. Hart et al.

U.S. Appl. No. 29/196,570, filed Dec. 31, 2003, Allison M. Hart et al.

U.S. Appl. No. 29/196,569, filed Dec. 31, 2003, Allison M. Hart et al.

U.S. Appl. No. 29/196,568, filed Dec. 31, 2003, Allison M. Hart et al.

ISO/IEC Standard 7811—Identification Cards Recording Technique Aug. 15, 1995.

Axiohm Model C702E/C712EHC, Model C702KP/C712KP Operation Instructions 1998.

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 18, 19, 36, 37, 55 and 56 is confirmed.

Claims 1–17, 20–35, 38–54 and 57 are cancelled.

\* \* \* \* \*